United States Patent Office 3,180,694
Patented Apr. 27, 1965

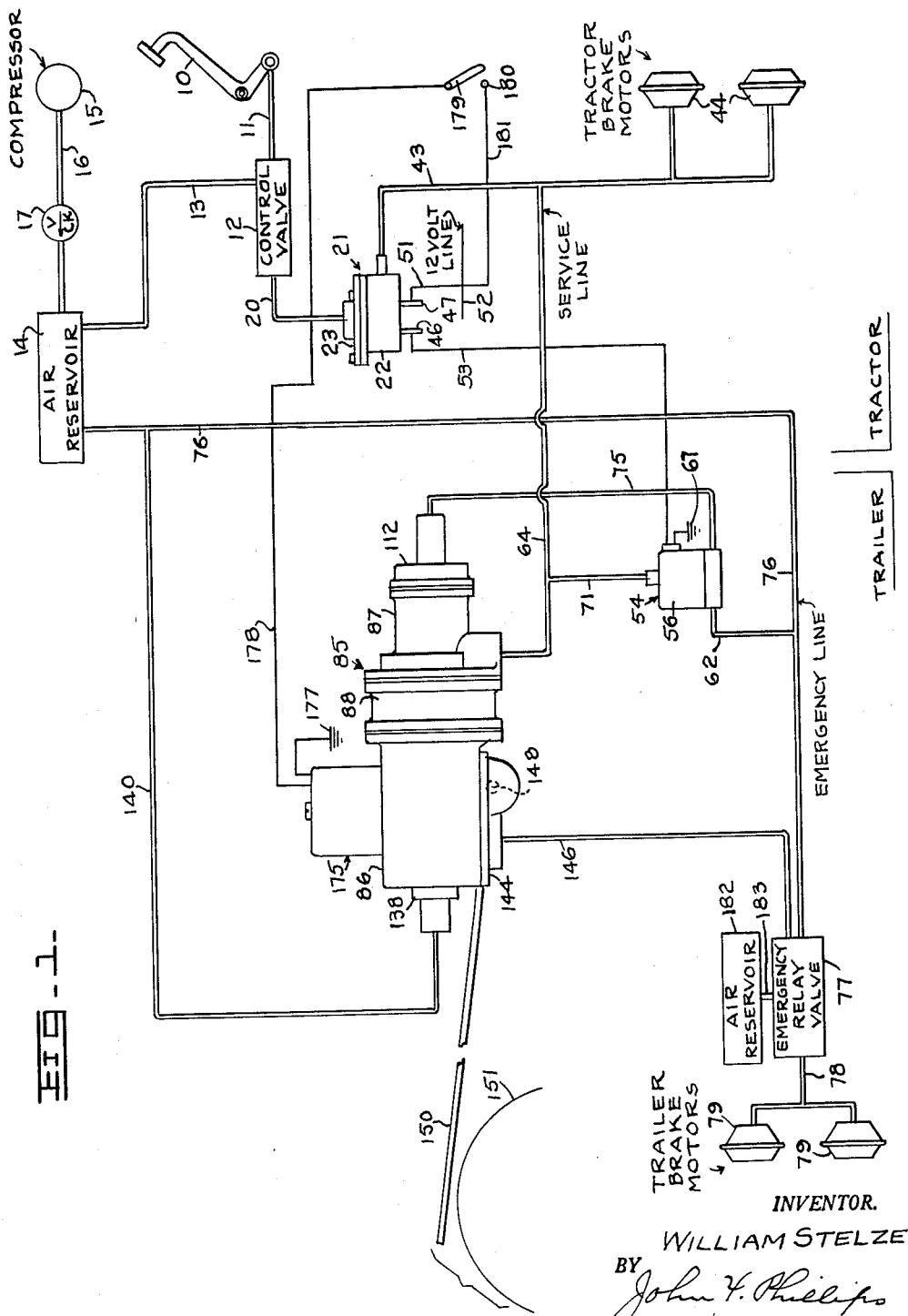

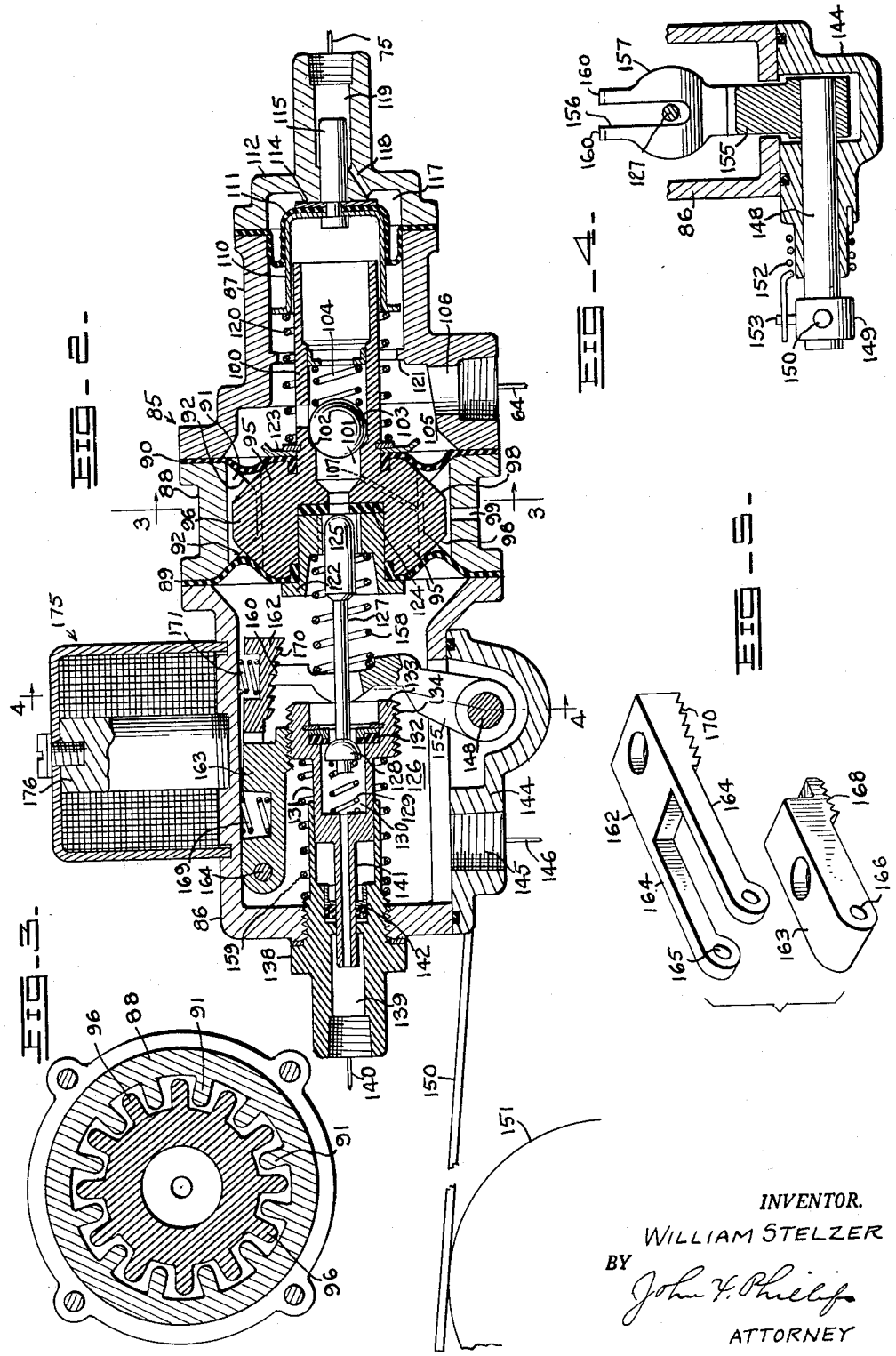

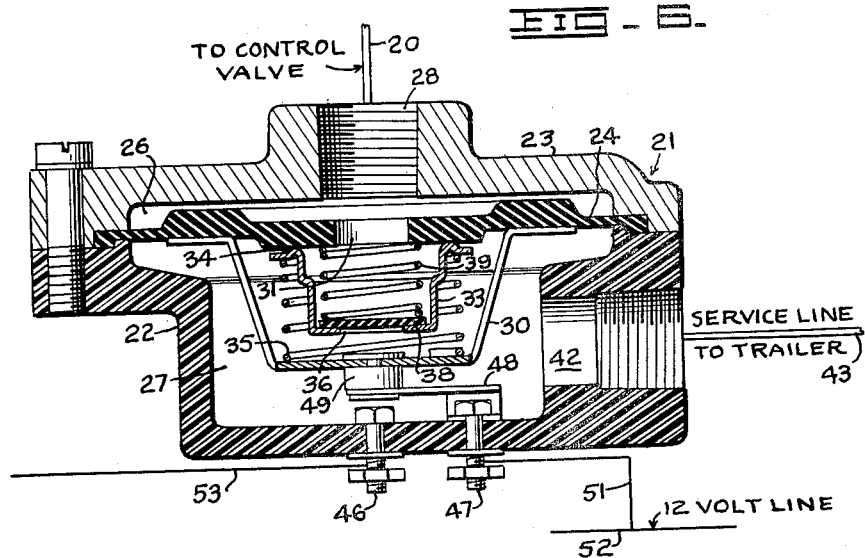
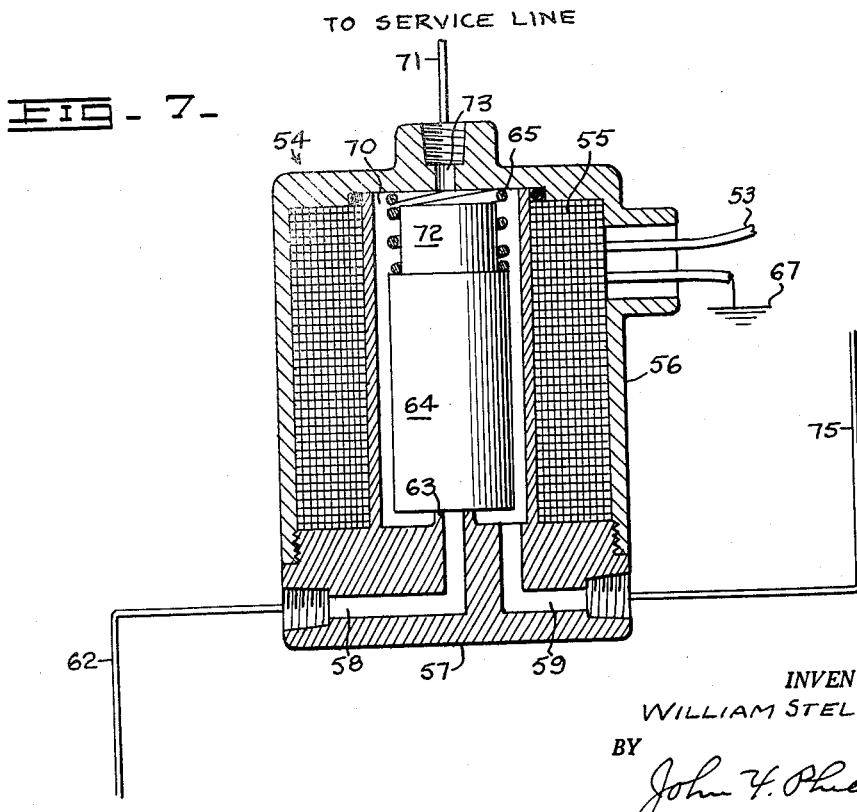

3,180,694
AUTOMATIC LOAD CONTROL BRAKING SYSTEM FOR MOTOR VEHICLES
William Stelzer, Bloomfield Hills, Mich., assignor to Kelsey-Hayes Company, Romulus, Mich., a corporation of Delaware
Filed Aug. 29, 1961, Ser. No. 134,726
14 Claims. (Cl. 303—7)

This invention relates to an automatic load control braking system for motor vehicles, particularly for use in controlling the braking of the trailers of tractor-trailer combinations according to the loads carried by the trailers.

An important object of the invention is to provide a mechanism which senses the load on a vehicle, and particularly a trailer, to set the ratio of force of application of the trailer brakes relative to the tractor brakes in accordance wtih the load carried by the trailer.

A further object is to provide a system wherein the degree of setting of the trailer brakes in a tractor-trailer brake system is automatically determined in accordance with the load being carried by the trailer.

A further object is to provide such a system wherein the trailer brakes, regardless of the setting of the braking ratio, are applied ahead of the tractor brakes to prevent jackknifing.

A further object is to provide such a system wherein movement of the vehicle body relative to the axles under the influence of vehicle loads is automatically utilized for increasing the ratio of application of the trailer brakes relative to the tractor brakes as the load increases.

A further object is to provide such a system wherein the adjustment of the braking ratio is effected by a positioner which senses the static load when the trailer is not moving, and to provide means for locking the setting of the device after the load sensing has taken place and the vehicle is in motion.

A further object is to provide means engageable with the vehicle axle for sensing the load, and to disengage the sensing device from the axle during movement of the trailer to eliminate unnecessary wear on the parts.

A further object is to utilize the ratio changer in combination with a snubbing mechanism whereby the trailer brakes may be snubbed without applying the tractor brakes and wherein such mechanism operates ideally with the automatic load control means.

Other objects and advantages of the invention will become apparent during the course of the following description.

In the drawing I have shown one embodiment of the invention. In this showing:
FIGURE 1 is a diagrammatic representation of the system as a whole, the load controlling mechanism being shown in elevation;
FIGURE 2 is an enlarged axial sectional view through the load control mechanism;
FIGURE 3 is a transverse section on line 3—3 of FIGURE 2;
FIGURE 4 is a fragmentary sectional view on line 4—4 of FIGURE 2;
FIGURE 5 is a detail perspective view of a pair of load control and locking elements shown separated;
FIGURE 6 is an enlarged sectional view through a pressure operated switch control mechanism; and
FIGURE 7 is a similar view of a solenoid controlled three-way valve connected to the switch mechanism.

Referring to FIGURE 1, the numeral 10 designates a conventional brake pedal arranged in the present instance on the tractor and connected by a rod 11 to a conventional follow-up control valve mechanism 12. This valve mechanism is supplied in the present instance with superatmospheric pressure through a line 13 connected to an air reservoir 14 in which pressure is maintained by a compressor 15 connected thereto by a line 16 in which is interposed a check valve 17.

The control valve 12 is connected by a fluid line 20 to a pressure operated switch mechanism indicated as a whole by the numeral 21. This mechanism is shown in detail in FIGURE 6 and comprises a body 22 to the top of which is secured a cap 23, and a rubber or similar diaphragm 24 is clamped between the cap 23 and body 22. The diaphragm divides the device to form upper and lower chambers 26 and 27 the former of which communicates through a port 28 with the pipe 20.

A support 30 is mounted in the body 22 and is bonded or otherwise secured to the diaphragm 24. This diaphragm is provided with a port 31 to afford communication between the chambers 26 and 27 under conditions to be referred to.

A cage 33 is arranged in the support 30 and has an upper annular bead 34 forming a valve engaging the diaphragm 24, and the cage is urged upwardly by a light spring 35 to tend to maintain the valve 34 closed. The bottom of the cage 33 is provided with an opening 36 engaged by a rubber valve 38 urged downwardly by a spring 39. The valve device within the support 30 is quite similar to a conventional residual pressure valve employed in vehicle brake master cylinders. Pressure above a predetermined point in the chamber 26 will open the valve 34, while pressure above a predetermined point in the chamber 27 will open the valve 38. Operation of the pedal 10 causes the control valve mechanism 12 to supply pressure to the chamber 26 to operate the brake system as described below, and when the pedal is released, the valve mechanism 12 exhausts the line 20 to the atmosphere, and it is under such conditions that the valve 38 opens to release braking pressures from the system.

The chamber 27 is provided with a port 42 connected to one end of a service line 43, and this line is connected to the tractor brake motors 44. Thus when the valve 34 opens, the tractor brake motors will be operated.

The body 22 is formed of plastic or other insulating material and carries a pair of binding posts 46 and 47, the latter of which is fixed in the chamber 27 to one end of a switch arm 48 having its free end engaging a button 49 carried by the bottom of the support 30 and movable thereby into engagement with the upper end of the post 46. The post 47 is connected by a wire 51 to the 12-volt line 52 of the tractor. The post 46 is connected to one end of a wire 53 leading to a three-way valve indicated as a whole by the numeral 54.

The valve 54 comprises a solenoid 55 arranged in a housing 56 attached to a base 57 having passages 58 and 59. The passage 58 has its inner end turned upwardly and terminating in a valve seat 63 normally engaged by the armature 64 of the solenoid forming a valve for the seat 63. The armature 64 is biased downwardly by a spring 65. One terminal of the solenoid 55 is connected to the wire 53 leading to the binding post 46, while the other terminal of the solenoid is grounded as at 67.

A space 70 within the solenoid is adapted to be connected with the passage 58 when the solenoid is energized, and the space 70 communicates with a fluid line 71 tapped into the service line 74. The passage 59 is in constant communication with the space 70 and obviously communicates with the passage 58 when the solenoid is energized. The upper end 72 of the armature 64 acts as a valve to close the lower end of a port 73 communicating with the line 71, thus disconnecting this line from the space or chamber 70 when the solenoid 55 is energized. The passage 59 communicates with one end of a fluid line 75 leading to a control valve mechanism to be described.

The fluid line 62 communicates with an emergency line 76 connected to the air reservoir 14 and to an emergency relay valve 77. Upon operation of the relay valve in a manner to be described, fluid pressure is supplied from the emergency line 76 through a branched line 78 to the trailer brake motors 79.

The load control valve mechanism is indicated as a whole by the numeral 85 and is shown in detail in FIGURES 2–5, inclusive. This valve mechanism comprises two axially alined body sections 86 and 87 having an axially alined spacer 88 therebetween. Between the spacer 88 and the respective body sections 86 and 87 are clamped a pair of diaphragms 89 and 90. The spacer 88 (FIGURES 2 and 3) is provided with radially inwardly extending fingers 91 having opposite tapered edges which converge radially inwardly as at 92. Axially within the spacer 88 is arranged an axially movable body 95 having radially outwardly extending fingers 96 (FIGURE 3) arranged between the fingers 91. Opposite edges of the fingers 96 are tapered to converge radially outwardly as at 98. The space between the diaphragms 88 and 89 is vented to the atmosphere as at 99.

The axially movable body 95 is provided with an axial tubular extension 100 having a passage 101 provided with a valve seat 102 normally engaged by a ball valve 103 biased to closed position by a spring 104. When the valve 103 opens, pressure is rapidly exhausted from the passage 101 to a chamber 105 in the body section 85, which chamber is provided with a port 106 connected to the line 64.

The passage 101 communicates through a small passage 107 with the space between the diaphragms 88 and 89.

A diaphragm piston 110 is arranged in the body section 87 and a rolling diaphragm 111 is arranged over this piston and has its periphery clamped between the body section 87 and a head 112 secured to such body section. Movement of the diaphragm 111 and its piston 110 to the right in FIGURE 2 is limited by an abutment 114 forming a part of the head 112. A pilot stem 115 is slidable in the head 112 and is connected to the piston 110 and diaphragm 111 to guide these members. The diaphragm 111 forms with the head 112 a chamber 117 communicating through a port 118 with a chamber 119 formed in the head 112. The chamber 119 communicates with the fluid line 75, and accordingly the chamber 117 is always in communication with the chamber 70 (FIGURE 7). The diaphragm piston 110 is maintained in the normal position shown in FIGURE 2 by a spring 120, and a flange 121 limits movement of the piston 110 to the left.

The inner peripheries of the diaphragms 89 and 90 are held in position by means 122 and 123, the former of which is a plug also employed for securing in position a rubber valve seat 124. This seat is normally disengaged from but is engageable in a manner to be described by a valve 125 to control communication between the chamber 101 and the interior of the body section 86, forming a chamber 126. The valve 125 is formed at one end of a stem 127, the other end of which carries a hemispherical valve 128 arranged in a chamber 130 of a valve housing 131, the valve 129 normally engaging a rubber or similar valve seat 132 to close communication between the chambers 126 and 130. The valve 128 is biased to closed position by a spring 129. The valve housing 131 has an annular enlargement 133 provided with annular V-shaped grooves 134 for a purpose to be described.

A plug 138 is threaded axially in the end of the housing section 86 and has a bore 139 communicating with one end of a fluid line 140 the other end of which is tapped into the emergency line 76 (FIGURE 1). A bored axial extension 141 slides in the plug 138 and is sealed with respect thereto as at 142. In any shifted position of the valve housing 131, therefore, the chamber 130 is always in communication with the chamber 139.

The bottom of the housing section 86 is closed by a cap 144 ported as at 145 for communication with a fluid line 146 functioning as the rear end of the service line and connected to the emergency valve 77. Pressure signals in the line 146 control the emergency valve 77 to thus control the supply of fluid under pressure from the emergency line 76 to the trailer brake motors 79.

A rock shaft 148 is journaled in the cap 144 (FIGURES 2 and 4). One end of this shaft, externally of the load control mechanism, carries a collar 149 to which is attached one end of a sensing finger 150 engageable with the top of an axle 151 (FIGURES 1 and 2) of the trailer. A torsion spring 152 is connected between the cap 144 and a finger 153 secured to the collar 149 to bias the shaft 148 for counterclockwise turning movement as viewed in FIGURE 2 to bias the sensing finger 150 into engagement with the axle 151.

A rocker 155 is fixed at its lower end to the shaft 148 and is bifurcated at its upper end as at 156 to straddle the valve stem 127. Outwardly of the stem 127, the rocker 155 is widened as at 157 and bulged to engage the end of the valve housing 131 as shown in FIGURE 2. This widened portion of the rocker also serves as a seat for one end of a spring 158, the other end of which engages within the plug 122. A spring 159 biases the right-hand end of the valve housing 131 into engagement with the bulged portion of the rocker 155. The upper extremities of the bifurcated ends of the rocker 155 are provided with teeth 160 for a purpose to be described.

A pair of pawl members 162 and 163 are mounted to turn on a shaft 164 mounted in the housing section 86. The pawl member 162 is bifurcated to provide arms 164 lying on opposite sides of the pawl member 163, and the pawl members are provided respectively with openings 165 and 166 to receive the shaft 164. The pawl member 163 is provided with V-shaped teeth 168 engageable with the teeth 134 under conditions to be described to prevent movement of the valve housing 131. A spring 169 biases the pawl member 163 downwardly. The pawl member 162 is provided with ratchet teeth 170 engageable with the teeth 160 of the rocker 155. A spring 171 biases such pawl member downwardly to the normal position shown in FIGURE 2.

The housing section 86 is formed of aluminum or other nonmagnetic material, while the pawl members 162 and 163 are made of a ferrous material. On the top of the casing section 86 is mounted an electromagnet 175 having a core 176 which may be threaded in the top of the casing section 86. One terminal of this magnet is grounded as at 177, while the other terminal is connected to a wire 178 leading to a switch 179 movable into engagement with a contact 180 from which a wire 181 leads to the 12-volt line 52. The switch 179 may be manually operated, or it may be connected to a door of the cab of the tractor to be closed when such door is opened and to be opened when the cab door is closed, as further described below.

A conventional air reservoir 182 is connected as at 183 to the relay valve 77. In the event the emergency line 76 breaks, the relay valve 77 operates to connect the reservoir 182 to the motors 79 to apply the trailer brakes.

*Operation*

The parts occupy the normal positions shown in the drawings. Assuming that the driver desires to snub the trailer brakes without applying the tractor brakes, he will slightly depress the pedal 10 to admit through the line 20 to the chamber 26 (FIGURE 6) a pressure sufficient to deflect the diaphragm 24 but not to open the valve 34. The spring 35 is relatively weak, but is sufficiently strong to hold the valve 34 seated against the relatively light pressure necessary to move the diaphragm 24 downwardly and close the switch 48. Under such conditions, current will flow from the 12-volt line 52 through the wire 51, across the posts 47 and 46, through wire 66 and solenoid 55 (FIGURE 7) and thence to the ground 67. Under such conditions, the port 73 will be closed and the armature 64 will open the passage 58, whereupon pressure from the emergency line 76 will flow through line 62 and passage 58, into the chamber 70, and through passage 59 and line 75 to the chamber 117 (FIGURE 2). This pressure will move the diaphragm 111 to the left in FIGURE 2 and force is transmitted through the spring 120 to the member 95 to engage the seat 124 with the valve 125, whereupon such valve transmits movement to the valve 128 to unseat it. Pressure from the emergency line now flows through pipe 140 into chamber 139 and thence into chambers 130 and 126 and through the line 146 (FIGURE 1) to the emergency valve 77. This valve then operates to supply pressure from the emergency line 76 to the trailer brake motors 79 to snub the trailer brakes. The pressure supplied through the line 146 will be limited, since as pressure builds up in the chamber 126 (FIGURE 2) the diaphragm 89, subjected to such pressure, will overcome at a predetermined point the force being transmitted through the spring 120. Thus the seat 124 will back off to the right and the valve 128 will be seated. Accordingly the trailer brakes can be quickly snubbed without applying the tractor brakes. In this connection it is pointed out that the valve mechanism 85 is preferably arranged as close as practicable to the emergency relay valve 77 to shorten the line 146 so that there will be no lagging of the application of the trailer brakes. The complete functioning of the diaphragms 89 and 90 will be further described below.

As the trailer is loaded, the valve mechanism 85, carried by the body of the trailer, will move downwardly relative to the axle 151 and the extent of such movement obviously will depend on the load placed in the trailer. As such movement takes place, the sensing finger 150 will be moved relatively upwardly at its free end to tend to rock the shaft 148 and arm 155 clockwise as viewed in FIGURE 2. If the switch 179 is now closed manually, or if the driver opens the cab door to close such switch, a circuit will be closed from the line 52 through wire 181 (FIGURE 1), switch 179, wire 178 and electromagnet 175 and thence to the ground 177.

The electromagnet 175 will thus be energized to attract both pawl members 162 and 163 to swing their teeth 168 and 170 out of engagement with the teeth 134 and 160. The rocker 155 is thus freed to swing clockwise and force will be transmitted from this rocker, through the spring 158, to move the member 95 to the right as viewed in FIGURE 2. Obviously, the extent to which movement of the member 95 takes place will depend upon the loading of the vehicle. The greater the loading of the vehicle the greater will be the movement of the member 95. As such movement takes place, a smaller area of the diaphragm 89 will engage the sloping edges 98 and a greater area of the diaphragm 90 will engage the sloping edges 98 at its side of the member 95. This is important in the functioning of the device as a load control means since the smaller the area of the diaphragm 89 engaging the adjacent sloping edges 98, the greater will be the pressure in the chamber 126 necessary to overcome pressure in the chamber 105.

Assuming that the movement referred to has taken place and the driver closes the cab door or otherwise opens the switch 179 (FIGURE 1), the circuit through the electromagnet 175 will be broken and both pawls 163 and 164 will drop into engagement with their associated teeth 134 and 160. It will be apparent that as movement has been imparted to the rocker 155 as described above, the valve housing 131 will have been caused to follow such movement by the spring 159. When the electromagnet 175 is de-energized, the bulged portion 157 of the rocker 155 will be in contact with the adjacent end of the valve housing 131, and this valve housing will now be locked in position by the pawl 163. During the running of the vehicle, the deflection of the springs will cause the body of the vehicle to move upwardly and downwardly relative to the axle and any such downward movement will result in the transmission of upward force from the axle 151 to the sensing finger 150 to rock the member 155, and the teeth 160 will escape over the teeth 170 of the pawl 164, which will leave the sensing finger 150 spaced from the axle 151 to prevent undue wear between these elements (see FIGURE 2).

If the brakes of both the tractor and trailer are to be applied, the pedal 10 will be operated to admit pressure to the chamber 26 (FIGURE 6) and the switch 48 will be closed as described above to effect an immediate operation of the trailer brake motors. An appreciable operation of the pedal 10 will operate the valve mechanism 12 to admit pressure to the chamber 26 to open the valve 34, thus admitting pressure to the chamber 27 and service line 43, and pressure accordingly will be supplied to the tractor brake motors to apply the tractor brakes to the extent determined by the degree of operation of the control valve mechanism 12.

The operation of the switch 48 will have energized the solenoid 55 to admit pressure from the emergency line 76 through pipe 62 and passages 58 and 59 and thence into the line 75 and into the chamber 117 (FIGURE 2) in the manner described above in connection with the snubbing of the brakes. Pressure in the chamber 117 transmits force through the spring 120 to engage the seat 124 with the valve 125 and unseats the valve 128 to admit emergency line pressure to the chamber 126 and thus through the line 146 to the relay valve 77 and pressure will be supplied from the emergency line 76 to the trailer brake motors 79 to operate them. As before, the building-up of pressure in the chamber 126 (FIGURE 2) tends to move the member 95 toward the right to allow the valve 128 to seat. It will be recalled that in snubbing the brakes without admitting pressure to the service lines 43 and 64, no pressure will have been built up in the chamber 105, hence relatively low pressure in the chamber 126 will close the valve 128 to provide the snubbing action.

Under conditions now being considered where the tractor brakes are also being operated, the immediate snubbing of the trailer brakes will occur, but pressure will be built up in the chamber 105 from the line 64 and pressure in this chamber will assist the spring 120 in opposing movement of the member 95 to the right. Hence a greater pressure will be required in the chamber 126 to allow the valve 128 to close. Accordingly greater pressure than that which is present in the snubbing action will be transmitted through the pipe 146 to the emergency valve and the trailer brakes will be applied to a greater extent until the pressures in lines 64 and 146 gradually become equal.

The mechanism in FIGURE 2 acts as a proportioning device under all conditions and the application of the trailer brakes will be proportional to the application of the tractor brakes. The pressure in the chamber 126 necessary to move the member 95 to the right to allow the spring 129 to close the valve 128 depends on the load-positioning of the member 95 as predetermined by the pressure of the spring 158 acting toward the right in accordance with movement of the rocker 155. If the load is such that the parts are positioned as shown in FIGURE 2, a pressure in the chamber 126 approximately equal to the pressure in the chamber 105 plus the loading of the spring 120 will result in the closing of the valve 128. The reason for this is that substantially equal effective areas of the diaphragms 89 and 90 will be exposed to pressures in the chambers 126 and 105. It will be noted that some of the pressure forces acting against these diaphragms will be absorbed by the fingers 91. The remaining pressures will be transmitted to the fingers 96 and the areas of the two diaphragms which transmit forces to the fingers 96 are the effective areas of the diaphragms.

Assuming that the trailer is more heavily loaded and the member 95 has shifted to the right, an increased area of the diaphragm 89 will act against the fingers 91 and the effective area of the diaphragm 89, acting against the fingers 96, will be reduced. Conversely, the effective area of the diaphragm 90 will be increased as the member 95 is moved to the right in FIGURE 2. Therefore, a given pressure in the chamber 105 will withstand greater pressure in the chamber 106 before the pressure in the chamber 105 and the spring 120 yield to allow the valve 128 to close. Accordingly, under heavy load conditions, greater pressures will be built up in the chamber 126 to effect operation of the relay valve 77 to energize the trailer brake motors 79 to a greater extent.

Conversely, when the trailer is running light or lightly loaded, the reverse operation of the diaphragms 89 and 90 takes place, the effective area of the diaphragm 89 being increased and the effective area of the diaphragm 90 being decreased. Under such conditions, a pressure in the chamber 126 lower than pressure in the chamber 105 will be effective for allowing the valve 128 to close.

It is particularly pointed out that regardless of the load setting of the valve housing 131, the valve 125 will be normally open since, when the load increases to permit movement of the valve housing 131 to the right, corresponding movement of the valve 125 to the right will be accompanied by corresponding movement of the member 95 transmitted thereto by the spring 158. Conversely, when the trailer is lightly loaded and the solenoid 175 is energized to release the two pawls from their associated teeth, the rocker 155 will swing relatively to the left in FIGURE 2, reducing the loading of the spring 158 so that the spring 120 will shift the member 95 to the left. Thus the valve 125 will always be normally open and the valve 128 normally closed and the valve 125 will be closed instantaneously upon the building up of a pressure in the chamber 117 incident to operation of the three-way valve 54, after which the valve 128 will be opened as described.

When the brakes are to be released, the operator releases the brake pedal 10 to restore the normal condition of the control valve 12, the line 20 being vented to the atmosphere. The lines 43 and 64 will be under pressure, and pressure having been released from the chamber 26 (FIGURE 6), pressure in the chamber 27 will open the valve 38. Accordingly pressure will be exhausted from the tractor brake motors and from the chamber 105 (FIGURE 2). Assuming that the valve 125 was closed prior to the releasing of the brake pedal, the releasing of pressure from the chamber 105 (FIGURE 2) will render pressure in the chamber 126 operative for shifting the member 96 to the right to open the valve 125. Pressure in the chamber 126 will then be rapidly released by the unseating of the ball 103. Thus both chambers 105 and 126 will be relieved of pressure through the lines 64 and 43, valve mechanism 21 and control valve mechanism 12. The valve 103 provides for a quick relieving of pressure from the chamber 126, and any residual pressure therein, when the valve 103 is closed by the spring 104, will be relieved through the passage 107 and port 99. The passage 107 is restricted and causes the chamber 101, upon the closing of the valve 103, to act as a dash pot. It will be apparent that high pressure in the chamber 126 relative to pressure in the chamber 105 when the latter is vented causes the member 95 to move rapidly and substantially to the right, and the dash-pot action of the restricted passage 107 retards the speed of movement of the member 95 back to its normal position under the influence of the spring 120.

The releasing of the brake pedal also permits the opening of the switch 48 (FIGURE 6) and thus de-energizes the solenoid 55 (FIGURE 7). The armature 64 thus will be returned to its normal position shown in FIGURE 7, the port 73 being opened and the passage 58 closed. The chamber 70 will be disconnected from the line 62 and the port 73, being opened, will afford connection between the lines 71 and 75, thus balancing pressure in the chambers 105 and 117. Thus all of the parts will return to normal positions.

The mechanism comprising the movable member 95 and diaphragms 89 and 90 forms per se no part of the present invention, such mechanism being disclosed and claimed in my copending application Serial No. 842,393, filed September 25, 1959 now Patent No. 3,011,833, granted December 5, 1961. In the copending application the member corresponding to the movable member 95 is subject to manual adjustment to operate as a pressure control means, whereas such mechanism in the present case operates with other elements in the combination to be automatically set for controlling the operation of fluid pressure motor operated vehicle brakes.

From the foregoing it will be apparent that the present system is automatically operative for determining the degree of application of one set of vehicle brakes relative to another, for example the setting of trailer brakes relative to tractor brakes in accordance with the load being carried. Thus, with no attention on the part of the operator, the system operates automatically to provide the proper braking of the trailer brakes, underbraking and overbraking thus being prevented.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A braking system for a motor vehicle having a body and axle constituting relatively movable vehicle parts and having a set of brakes provided with fluid pressure operated actuators, a fluid line for supplying fluid pressure to said actuators, a fluid pressure regulator, a source of pressure connected to said pressure regulator, pedal operable means for operating said pressure regulator to supply pressure from said source to said fluid line, automatic means for adjusting said pressure regulator to determine the pressure supply from said source to said fluid line in accordance with relative movement between said body parts incident to changes in the static loads on the vehicle, and means rendered operative by a part of said automatic means for rendering said automatic means insensitive to relative movement between said vehicle parts when the vehicle is moving.

2. A braking system for a motor vehicle having a body and an axle constituting relatively movable vehicle parts and having a set of brakes provided with fluid pressure operated actuators, a fluid line for supplying fluid pressure to said actuators, a fluid pressure regulator, a source of pressure connected to said pressure regulator, pedal operable means for operating said pressure regulator to supply pressure from said source to said fluid line, said pressure regulator being carried by one of said vehicle parts, and sensing means carried by said pressure regulator and engaging the other vehicle part to be operated in accordance with movement of said pressure regulator relative to said axle incident to increasing static loads on the vehicle while the latter is at rest for adjusting said pressure regulator to supply higher pressures from said source to said fluid line and means rendered operative by said sensing means while the vehicle is in motion for holding said sensing means out of engagement with said other vehicle part.

3. A braking system for a motor vehicle having a body and an axle constituting relatively movable vehicle parts and having a set of brakes and pressure operated actuators therefor, a pressure regulating valve mechanism having a first chamber and a second chamber, a pressure source, a fluid line connecting said source to said second chamber, means connected between said second chamber and said actuators for controlling the pressure supplied to said actuators in accordance with pressure in said second chamber, pedal operable means for supplying pressure to said first chamber, a pressure responsive device between said chambers, a valve device normally closing communication between said second chamber and said source and connected to be operated by said pressure responsive device upon movement thereof in one direction, the building-up of pressure in said second chamber opposing pressure in said first chamber to move said pressure responsive device in the other direction to close said valve, said pressure responsive device being adjustable to predetermine the pressure necessary in said second chamber to overcome pressure in said first chamber, sensing means automatically operative upon an increase in the static loading of the vehicle for adjusting said pressure responsive device to require a greater pressure in said second chamber for moving said pressure responsive device to close said valve, and locking means rendered operative by movement of said sensing means incident to relative movement of said vehicle parts when the vehicle is moving for rendering said sensing means insensitive to said relative movement.

4. A system according to claim 3 wherein said pressure regulating valve mechanism is carried by one of said vehicle parts, said sensing means comprising an element connected between said valve mechanism and the other of said vehicle parts to adjust said pressure responsive device to increase the pressure in said second chamber necessary to move said pressure responsive device against pressure in said first chamber when said vehicle parts move relative to each other incident to increasing loads on the vehicle.

5. In a tractor trailer brake system having fluid pressure operated tractor brake and trailer brake actuators, a source of pressure, a service line connected to the tractor brake actuators, pedal operable means for connecting said source to said service line to operate said tractor brake actuators, an automatic load control valve mechanism comprising a first chamber connected to said service line and a second chamber, a pressure responsive device separating said chambers and comprising an outer annular member having radially inwardly projecting fingers tapered at their ends to converge radially inwardly, an inner axially movable member having outer radial fingers extending between said first named radial fingers and tapered to converge radially outwardly, and diaphragms sealed to said axially movable body and to said annular member and engaging said tapered ends whereby, when said axially movable member is moved in one direction, the effective area of one of said diaphragms engaging the adjacent tapered ends of said axially movable member will increase and the effective area of the other diaphragm engaging the adjacent tapered faces of said axially movable member will decrease to thus determine relative pressures in said chambers which will effect axial movement of said member, said member having an axial port normally connecting said chambers and provided with a valve seat, a normally open first valve engageable with said seat, an axially shiftable valve housing provided with an inlet chamber communicating with said source, a valve seat between such inlet chamber and said second chamber, a normally closed valve engaging said last named seat and connected to said normally open valve whereby when said body is shifted axially in one direction said normally open valve will be closed and said normally closed valve will be opened to admit pressure from said source to said second chamber, control means operable by pressure in said second chamber for connecting the trailer brake actuators to said source, means operable by said pedal operable means for connecting said first chamber to said source to shift said body in said one direction to close said normally open valve and open said normally closed valve, automatic means operative under the influence of increased static loads on the trailer for shifting said member and said valve housing in the other direction to reduce the effective area of said diaphragm subject to pressure in said second chamber whereby greater pressures will be required in said second chamber to shift said member in said other direction for the closing of said normally closed valve to thereby supply greater pressure from said second chamber to said control means for operating the trailer brake actuators, and devices for rendering said automatic means inoperative for moving said movable member when the vehicle is moving, and electrically operated means operable upon initial operation of said pedal-operable means for shifting said body independently of pressure in said first chamber to close said normally open valve and open said normally closed valve.

6. In a tractor trailer brake system having fluid pressure operated tractor brake and trailer brake actuators, a source of pressure, a service line connected to the tractor brake actuators, pedal operable means for connecting said source to said service line to operate said tractor brake actuators, an automatic load control valve mechanism comprising a first chamber connected to said service line and a second chamber, a pressure responsive device separating said chambers and comprising an outer annular member having radially inwardly projecting fingers tapered at their ends to converge radially inwardly, an inner axially movable member having outer radial fingers extending between said first-named radial fingers and tapered to converge radially outwardly, and diaphragms sealed to said axially movable body and to said annular member and engaging said tapered ends whereby, when said axially movable member is moved in one direction, the effective area of one of said diaphragms engaging the adjacent tapered ends of said axially movable member will increase and the effective area of the other diaphragm engaging the adjacent tapered faces of said axially movable member will decrease to thus determine relative pressures in said chambers which will effect axial movement of said member, said member having an axial port normally connecting said chambers and provided with a valve seat, a normally open first valve engageable with said seat, an axially shiftable valve housing provided with an inlet chamber communicating with said source, a valve seat between such inlet chamber and said second chamber, a normally closed valve engaging said last-named seat and connected to said normally open valve whereby when said body is shifted axially in one direction said normally open valve will be closed and said normally closed valve will be opened to admit pressure from said source to said second chamber, control means operable by pressure in said second chamber for connecting the trailer brake actuators to said source, means operable by said pedal operable means for connecting said first chamber to said source to shift said body in said one direction to close said normally open valve and open said normally closed valve, automatic means operative under the influence of increased static loads on the trailer for shifting said member and said valve housing in the other direction to reduce the effective area of said diaphragm subject to pressure in said second chamber whereby greater pressures will be required in said second chamber to shift said member in said other direction for the closing of said normally closed valve to thereby supply greater pressure from said second chamber to said control means for operating the trailer brake actuators, said valve mechanism having a third chamber, pressure responsive means subject to pressure in said third chamber and having resilient connection with said member, a fluid line connected between said source and said third chamber, and an electrically operable valve in such fluid line operable upon initial operation of said pedal operable means for opening such fluid line to said source whereby pressure in said third chamber will shift said member in said other direction independently of pressure in such chamber to close said normally open valve and open said normally closed valve.

7. In a tractor trailer brake system having fluid pressure operated tractor brake and trailer brake actuators, a source of pressure, a service line connected to the tractor brake actuators, pedal operable means for connecting said source to said service line to operate said tractor brake actuators, an automatic load control valve mechanism comprising a first chamber connected to said service line and a second chamber, a pressure responsive device separating said chambers and comprising an outer annular member having radially inwardly projecting fingers tapered at their ends to converge radially inwardly, an inner axially movable member having outer radial fingers extending between said first-named radial fingers and tapered to converge radially outwardly, and diaphragms sealed to said axially movable body and to said annular member and engaging said tapered ends whereby, when said axially movable member is moved in one direction, the effective area of one of said diaphragms engaging the adjacent tapered ends of said axially movable member will increase and the effective area of the other diaphragm engaging the adjacent tapered faces of said axially movable member will decrease to thus determine relative pressures in said chambers which will effect axial movement of said member, said member having an axial port normally connecting said chambers and provided with a valve seat, a normally open first valve engageable with said seat, an axially shiftable valve housing provided with an inlet chamber communicating with said source, a valve seat between such inlet chamber and said second chamber, a normally closed valve engaging said last-named seat and connected to said normally open valve whereby when said body is shifted axially in one direction said normally open valve will be closed and said normally closed valve will be opened to admit pressure from said source to said second chamber, control means operable by pressure in said second chamber for connecting the trailer brake actuators to said source, means operable by said pedal operable means for connecting said first chamber to said source to shift said body in said one direction to close said normally open valve and open said normally closed valve, automatic means operative under the influence of increased static loads on the trailer for shifting said member and said valve housing in the other direction to reduce the effective area of said diaphragm subject to pressure in said second chamber whereby greater pressures will be required in said second chamber to shift said member in said other direction for the closing of said normally closed valve to thereby supply greater pressure from said second chamber to said control means for operating the trailer brake actuators, said pressure regulating valve mechanism being carried by the body of the trailer, said means for moving said member in said direction comprising a rocker in said second chamber, a spring connected between said rocker and said member, and a sensing element connected between said rocker and the axle of the vehicle to turn said rocker and transmit a force through said spring to said member to shift it in said direction when the trailer body moves downwardly relative to the axle of the trailer incident to increasing loads on the trailer, said valve housing being biased into engagement with said rocker to follow said turning movement.

8. A system according to claim 7 provided with means for locking said valve housing in any position it may assume in following turning movement of said rocker, and electrically operable means for releasing said locking means.

9. A system according to claim 8 provided with ratchet teeth over which said rocker is adapted to escape incident to movement of said sensing element while the trailer is in motion to lock said sensing element in an upward position out of engagement with said trailer axle, said electrically operable means comprising a magnet operating on both said locking means and said ratchet to release them from said valve housing and said rocker when the vehicle is stationary.

10. In a tractor trailer brake system having fluid pressure operated tractor brake and trailer brake actuators, a service line connected to the tractor brake actuators, a source of pressure, a pressure regulating valve mechanism having a first chamber connected to said service line and a second chamber, a fluid line connecting said second chamber to said source, means operative in accordance with pressure in said second chamber for supplying pressure from said source to said trailer brake actuators, a valve device normally providing for the flow of fluid from said second chamber to said first chamber and closing said second chamber to said source, pressure responsive means between said chambers comprising a member movable in one direction to close communication between said chambers and open said second chamber to said source, said valve mechanism having a third chamber, a pressure responsive element subject to pressure in said third chamber and having connection with said movable member to effect said movement thereof, a valve device having a pressure responsive element dividing it to form an inlet chamber and an outlet chamber the latter of which is connected to said service line, a pedal operable control valve for supplying pressure to said inlet chamber, oppositely opening valves controlling communication between said inlet and outlet chambers and biased to closed positions whereby it requires a predetermined pressure in either of said inlet or outlet chambers above pressure in the other such chamber to communicate therebetween, a switch operable by said pressure responsive member to be closed at a pressure in said inlet chamber lower than the pressure necessary to connect such chamber to said outlet chamber, and an electromagnetic valve normally connecting said first and third chambers and having a circuit closed by said switch to disconnect said first and third chambers and open said third chamber to said source to effect said movement of said movable member to admit pressure to said trailer brake actuators without operating said tractor brake actuators, the admission of greater pressure to said inlet chamber opening the latter to said outlet chamber to operate said tractor brake actuators and to supply a pressure to said first chamber to assist pressure in said third chamber in moving said movable member in said direction and thus to require greater pressure in said second chamber to effect movement of said movable member in the other direction to close communication between said second chamber and said source.

11. A system according to claim 10 wherein said pressure responsive device of said pressure regulating valve mechanism comprises an annular outer member having inwardly extending fingers provided with ends tapered to converge radially inwardly, said movable member having radially outwardly extending fingers between said first named fingers and having ends tapered to converge radially outwardly, diaphragms exposed respectively to said first and second chambers and engaging said tapered ends whereby movement of said movable member in either direction increases the effective area of one diaphragm engaging the adjacent tapered edges of said movable member and decreases the effective area of the other diaphragm engaging the adjacent tapered ends of said movable member, said pressure regulating valve mechanism being carried by the trailer body, and means comprising a sensing element connected between said pressure regulating valve mechanism and a trailer axle and subject to downward movement of said pressure regulating valve mechanism relative to said axle incident to increased trailer loads for shifting said axially movable member in the other direction to reduce the effective area of the diaphragm exposed to pressure in said second chamber to thus require a greater pressure in such chamber before closing communication between said second chamber and said source.

12. A braking system for a motor vehicle having a body and an axle provided with brakes operated by fluid pressure actuated actuators, a fluid line for supplying fluid pressure to said actuators, pedal controlled means for supplying fluid pressure to said line to apply the brakes, a pressure regulator interposed in said fluid line and having sensing means to sense the position of the axle relative to the body and to operate said pressure regulator to modify the fluid pressure transmitted to said brakes, whereby an increase in the distance between the body and axle reduces the fluid pressure and a reduction in the distance increases the fluid pressure transmitted to said brakes, locking means to mechanically engage and lock said sensing means in position when said vehicle is moving, said locking means being biased to a locked position, and remote control means comprising a remotely controlled electrically energizable solenoid of which said locking means acts as an armature whereby energization of said solenoid will release said locking means.

13. A braking system for a motor vehicle having a body and an axle provided with brakes operated by fluid pressure actuators, said body and axles constituting relatively movable vehicle parts, a fluid line for supplying fluid pressure to said actuators, pedal controlled means for supplying fluid pressure to said line to apply the brakes, a pressure regulator interposed in said fluid line, said pressure regulator comprising a casing carried by one of said vehicle parts, an axially shiftable pressure responsive member therein and first and second chambers at opposite sides of said shiftable member, a normally open valve connecting said chambers, a valve biased to a normally closed position controlling communication between said second chamber and a pressure source and connected to said normally open valve, pedal operable means for supplying pressure to said first chamber to close said normally open valve and open said normally closed valve, a sleeve having a valve seat normally engaged by said normally closed valve and biased in a direction away from said normally closed valve whereby, when said sleeve is released, said normally open valve will close and said normally closed valve will open, a pair of locking devices one of which normally engages said sleeve, a rocker engaging said sleeve to limit its biased movement, a sensing element engaging the other relatively movable vehicle part and connected to said rocker, the other locking device normally engaging said rocker, and an electro-magnetic device of which said locking devices comprise armatures whereby, when said electro-magnetic device is energized, said locking devices will be released.

14. A braking system according to claim 13 wherein said other locking device and rocker have inter-engaging ratchet teeth engageable when said electro-magnetic device is de-energized to permit movement of said rocker away from said sleeve as movement is imparted to said rocker by said sensing element, said ratchet teeth thus maintaining said sensing element out of engagement with said other vehicle part while the vehicle is moving.

References Cited by the Examiner

UNITED STATES PATENTS

| 2,344,868 | 3/44 | Hewitt | 303—22 |
| 2,919,161 | 12/59 | Hammer | 303—6.1 X |
| 3,010,768 | 11/61 | Obrin | 303—7 |
| 3,011,833 | 12/61 | Stelzer | 303—22 |
| 3,018,136 | 1/62 | Williams | 303—22 X |
| 3,059,976 | 10/62 | Whelan | 303—66 |

FOREIGN PATENTS 750,444  6/56  Great Britain.

ARTHUR L. LA POINT, *Primary Examiner.*

A. JOSEPH GOLDBERG, EUGENE G. BOTZ,
*Examiners.*